Colburn & Hanson,
Steam Engine Attachment,
No. 1,862 Reissued Feb. 7, 1865.
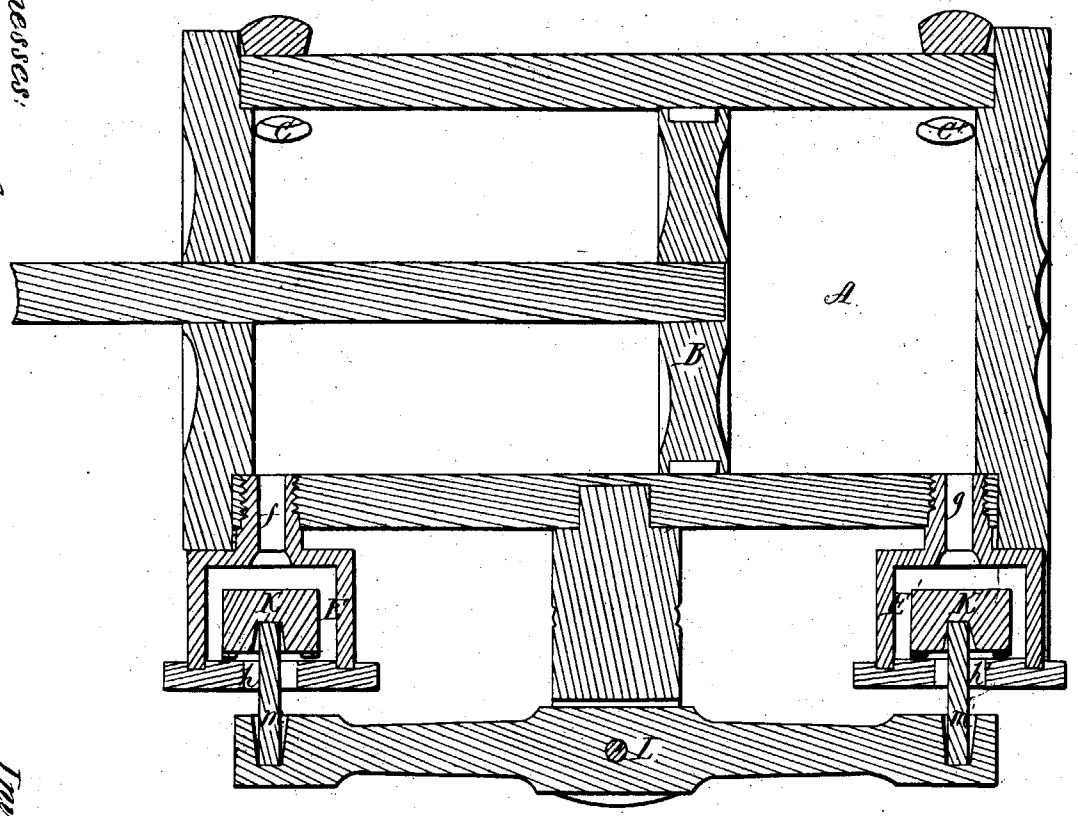
Witnesses:
F. P. Hart
H. E. Fisher
Inventor:
Richard Colburn and I. W. Hanson
by their Attorney
R. H. Eddy
N. PETERS, PHOTO-LITHOGRAPHER, WASHINGTON, D. C.

UNITED STATES PATENT OFFICE.

RICHARD COLBURN AND L. W. HANSON, OF NORWICH, CONNECTICUT.

IMPROVEMENT IN SUPPLEMENTAL VALVES FOR STEAM-ENGINES.

Specification forming part of Letters Patent No. 14,906, dated May 20, 1856; Reissue No. 1,862, dated February 7, 1865.

*To all whom it may concern:*

Be it known that we, RICHARD COLBURN and L. W. HANSON, both of Norwich, in the county of New London and State of Connecticut, have made a new and useful invention having reference to steam-engines, and being for the purpose of freeing the cylinders thereof from water and back steam; and we do hereby declare the following description and accompanying drawing to constitute a specification of such invention, the said drawing representing a longitudinal section through the cylinder and piston of a steam-engine, with our additions thereto.

In proportion as the slide-valves of high-pressure steam-engines provided with such valves are caused to lap for the purpose of working the steam expansively a back-pressure will be produced behind the piston by the failure of the exhaust-port to remain open to the end of the stroke, this difficulty being increased in "locomotives" on account of the necessary limits of the exhaust-passage thereof. Various efforts have been made to remedy the difficulty or remove such back-pressure from the piston. This we accomplish by our invention, in the carrying out of which we employ a peculiar apparatus auxiliary to the main exhaust and operated solely by the steam as it is admitted to the cylinder, and not through the intervention or use of any connections whatever with the moving parts of the remaining machinery of the engine.

To enable others skilled in the art to understand our invention and put the same in practice, we will proceed to describe the manner in which we have carried it out.

In the accompanying drawing, A denotes a steam-engine cylinder, and B the piston thereof. C C′ are the steam-ports, and *f* and *g* are openings in the lower part of the cylinder, such openings communicating with valve-boxes E E′. Within these boxes are valves K K′, which are arranged over and so as to operate with openings *h h′*, made through the bottoms of the boxes. The valves rest on rods *m m′*, that are supported upon the arms of a vibratory lever, L, the whole being as shown in the drawing.

The operation of these valves, whose seats are the bottoms of the boxes E E′, may be thus described: When steam is admitted through the port C, the valve K will be instantly closed, and the valve K′ will be opened. Thus a way will be opened through the passage *h′* for the escape of the exhaust-steam which may be in advance of the piston-head, such way remaining open during the whole length of the stroke of the piston and until the steam may be admitted through the opposite port, C′. On the passage of the steam into the cylinder through the port C′ the valve K′ will be closed and the valve K opened, and the steam from the other side of the piston-head will pass off through the opening *h*. These valves are thus self-operating, and for their operation require no connections whatever with the other moving parts of the engine. It will also be perceived that any steam that may be condensed within the cylinder will, as water, pass off through one of the openings *f* and *g*, and this whenever the valve K or K′ thereof may be open.

The above-described additions to the cylinder may be applied to any high-pressure engine, but are particularly applicable to locomotive-engine cylinders, the exhaust-steam of which is often employed to urge the fires of the boilers.

It is not intended by the use of our additions to the cylinder to dispense with the ordinary steam valve or valves thereof. By means of such additions a much greater lap may be given to the steam-valve without producing any compression behind the piston, and thus a great economy of steam and power will be effected.

In the apparatus exhibited in the accompanying drawing the surplus steam would flow through the openings *h h′* into the open air; but it is evident, however, that one or more suitable pipes or conduits may be adapted to these openings in order to conduct the steam and water away therefrom in such manner as may be desirable.

We do not confine our invention to the precise arrangement of the valves, valve-boxes, and the lever, as hereinbefore mentioned, nor to the modes of connecting the valve-boxes with the cylinder or with the exhaust, as such may be varied without changing the principle of our invention.

We claim as our invention—

1. The combination of an apparatus, substantially as described, and for the purposes specified, with the cylinder and piston of a steam-engine, such apparatus consisting of the passages *f g*, the valves-boxes E E′, the valves K K′, their seat-passages *h h′*, and the lever L′, or its equivalent.

2. The said apparatus constructed, substantially as described, and for the purpose or purposes as explained.

RICHARD COLBURN.
L. W. HANSON.

Witnesses:
P. F. M. ANDREWS,
JOSEPH W. CARTER.